June 12, 1962 R. L. BROEDER ET AL 3,038,522
MOLD CEMENT DISPENSER AND METHOD OF
CEMENTING SHELL MOLD SEGMENTS
Filed June 16, 1959 2 Sheets-Sheet 1
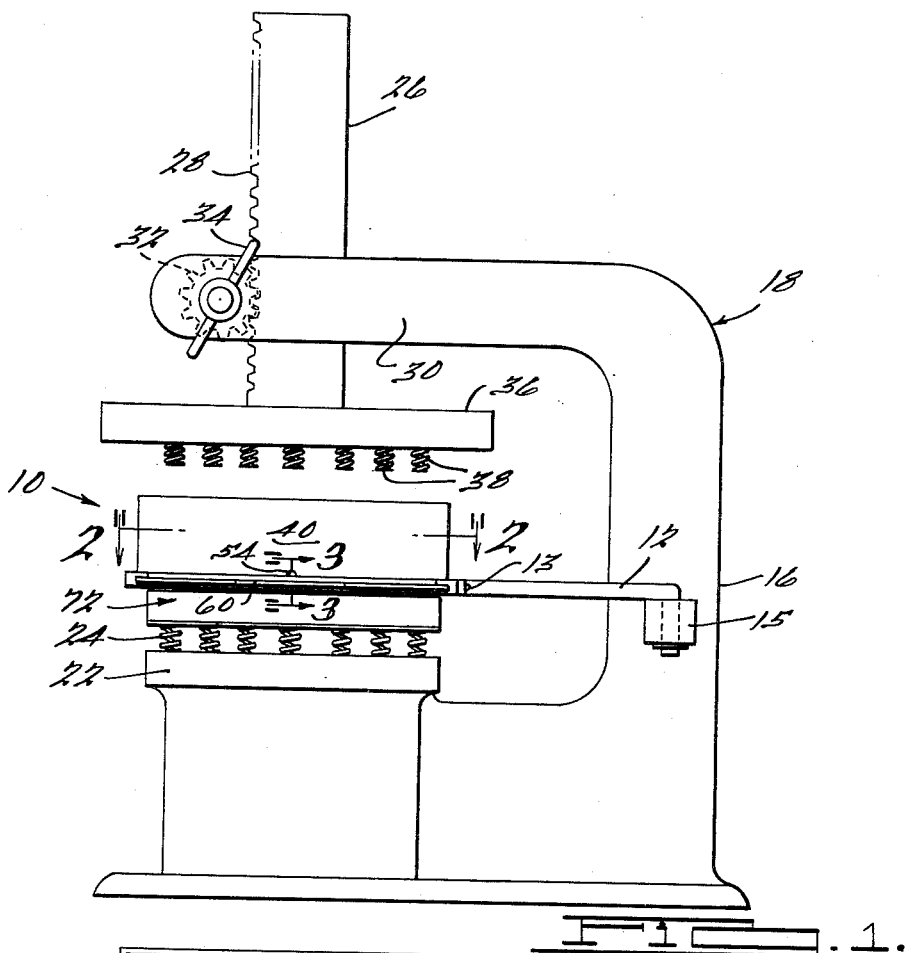
FIG. 1.
FIG. 2.
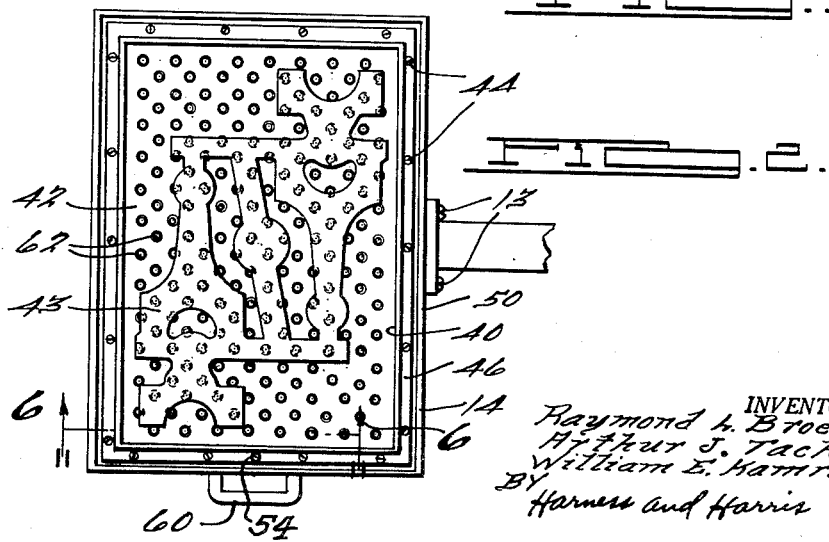
INVENTORS.
Raymond L. Broeder.
Arthur J. Tache.
William E. Kamradt.
BY Harness and Harris
ATTORNEYS.

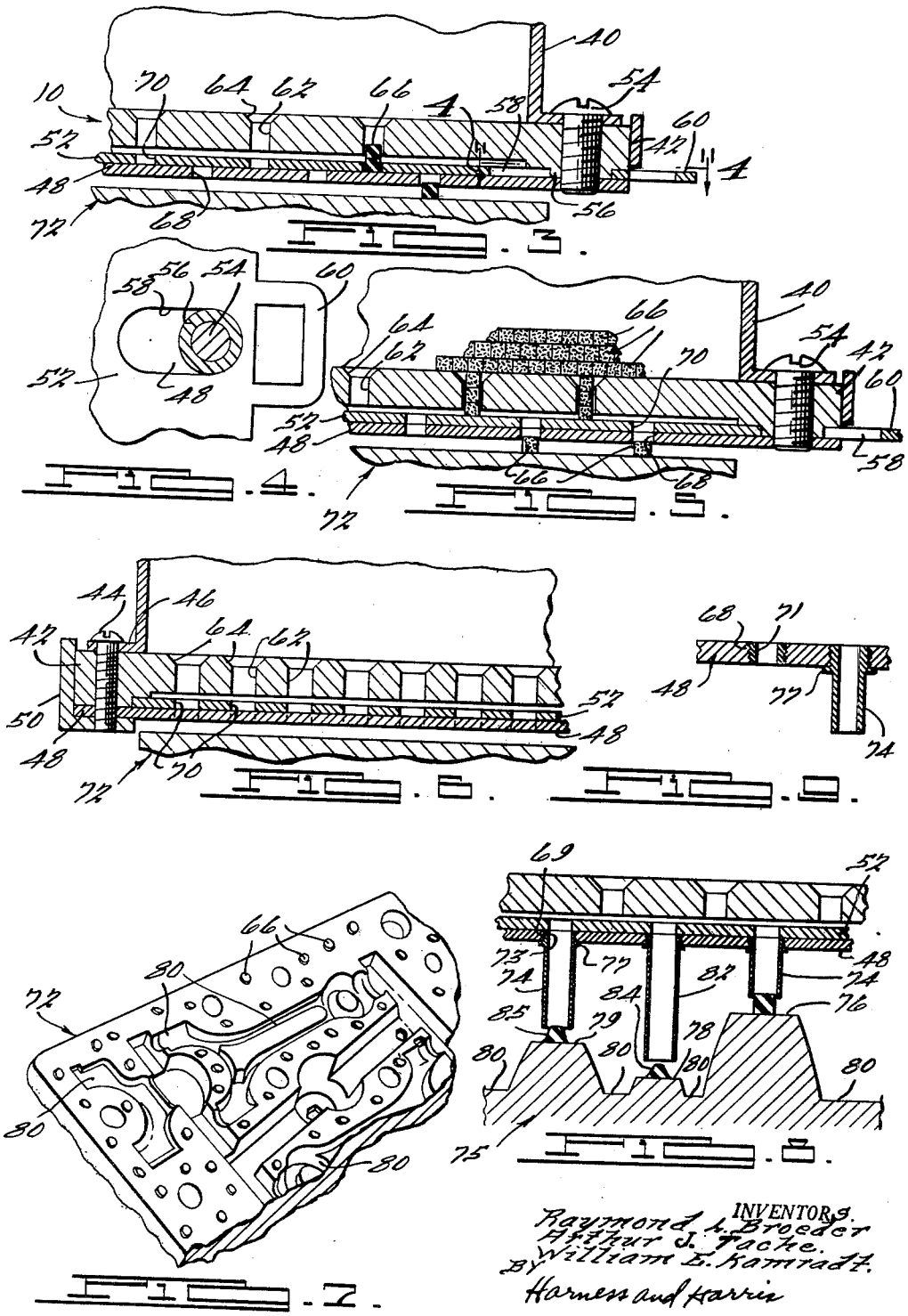

United States Patent Office 3,038,522
Patented June 12, 1962

3,038,522
MOLD CEMENT DISPENSER AND METHOD OF CEMENTING SHELL MOLD SEGMENTS
Raymond L. Broeder, Detroit, and Arthur J. Tache and William E. Kamradt, Madison Heights, Mich., assignors to Chrysler Corporation, Highland Park, Mich., a corporation of Delaware
Filed June 16, 1959, Ser. No. 820,647
7 Claims. (Cl. 156—378)

This invention relates to a novel type of resin cement pellet dispenser unit and to the method of securing shell mold segments together by dispensing these pellets to the joint or land portions of the mold segments and thereafter curing these pellets to produce a plastic cement joint between the mold segments at the lands thereof.

In the production of shell molds for use in metal casting operations the shell mold segments which are usually ceramic powder cemented or bound together by cured resin material are usually secured together by plastic cementing means, such as for example thermosetting phenolic resin, or any other type of thermosetting resins such as epoxy or melamine. The land portions or upstanding portions of each of these shell mold segments are normally the portions to which the cementing material is applied. The process of applying the resin to these lands is quite laborious if it is attempted to place the resin thereon by hand, such as by painting, spraying or placing pellets of the resin material thereon by hand or a hand operated instrument.

The present invention employs a novel type of pellet dispensing arrangement or apparatus which can deposit plastic thermosetting pellets upon the mold lands in predetermined configuration and at the proper distance with respect to the boundaries of the lands on the contoured space of the mold segments. This apparatus is quite unique in that it is able to deposit the pellets in a predetermined configuration with considerable accuracy so that the plastic pellets do not have an opportunity to either flow or fall into or otherwise get into the contoured passage portions of the mold into which the metal is subsequently flowed. It is particularly pointed out that if the pellets do get into the passages into which metal is flowed, voids within the cast article will surely occur due to the vaporization of the plastic pellet material due to the high temperatures of the liquid metal.

The apparatus of the present invention and the method of its application allows its use in depositing pellets upon complicated mold segment structures and also for a variety of contours of complicated mold segments due to the feature of a removable and readily replaceable stencil means which allows only certain portions of pellet apertures of the dispensing apparatus to function for a particular mold configuration.

A principal object of this invention is to provide an apparatus and method for dispensing resin cementing materials to the lands of mold sections whereby there is absolutely no chance of the cementing material getting into the molten metal passages of the mold.

Another object of this invention is to provide an apparatus and method for dispensing cementing materials onto the lands of different molds having wide variations in configurations with equal utility regardless of the complexity or configuration of the molds.

A specific object of this invention is to provide a pellet dispensing unit and a stencil means therefor for making said mold applicable to any configuration of shell mold structure.

Another specific object is to provide the aforesaid apparatus with pellet dispensing tubes to conform in height to any mold land configuration to avoid dropping of the pellets through an unregulated path onto said lands.

A further specific object is to provide a convenient attaching means for said tubes and also to provide adapter means when the tubes are not in use.

Further objects and advantages of the present invention will become apparent from the following dscription and drawings, in which:

FIGURE 1 represents an application of the present pellet dispensing structure used in cooperation with a press;

FIGURE 2 represents a view of the pellet dispensing unit taken along the line 2—2 of FIGURE 1 in the direction of the arrows;

FIGURE 3 represents a cross sectional view of the dispensing unit of FIGURE 2 taken along the line 3—3 thereof in the direction of the arrows;

FIGURE 4 represents a top view of the transfer slide of the unit taken along the line 4—4 of FIGURE 3 in the direction of the arrows;

FIGURE 5 represents a cross sectional view of the unit corresponding to FIGURE 3 with the transfer slide in a different operating position;

FIGURE 6 represents a cross sectional view of the unit of FIGURE 2 taken along the line 6—6 thereof in the direction of the arrows;

FIGURE 7 represents a top view of a shell mold segment with the cementing pellets deposited thereon;

FIGURE 8 represents a cross sectional view of the dispensing unit of FIGURE 1 with dispensing tubes secured to the dispensing plate thereof; and FIGURE 9 represents a cross sectional view of a variation of the dispensing plate.

Referring to FIGURE 1 of the drawings a pellet dispensing unit designated 10 is shown supported by a support means or arm 12 which is rigidly connected by bolts or other securing means 13 to a frame 14 which partially surrounds the unit, and this arm 12 is pivotally connected in a bushing 15 on portion 16 of a power press 18. Press 18 has a bed 22 which is provided with springs 24 to provide a maximum pressure regulating means for subsequent compression of mold segments to be hereinafter described. The press is provided with a ram 26 having a tooth rack 28 on one side thereof, and an arm 30 of the press is provided with a gear 32 meshing in rack 28. A handle 34 is provided on gear 32 for turning the same and moving the ram 26 of the press upwardly or downwardly. Attached to the ram 26 is an upper press platen 36 which is also provided with springs 38 to further regulate the maximum pressure permitted on the shell mold sections.

Referring to FIGURES 2 through 6, the pellet dispensing unit 10 is comprised of a pellet hopper 40 which is secured to a feed plate 42 by bolts 44 extending through flange 46 of the hopper and through feed plate 42 and also through a pellet dispenser plate 48 to be threadably received in frame means 50 which surrounds the two sides and the back of the feed plate 42 and dispenser plate 48. This hopper is normally filled with plastic cementing pellets so as to provide a constant flow of pellets to the apertures 62 in the feed plate 42.

A pellet transfer slide 52 is sandwiched between feed plate 42 and dispenser plate 48 and is slidable therebetween to two different positions, the first position shown in FIGURE 3 and the second position shown in FIGURE 5. A slide positioning stud 54 and a slide positioning bearing 56 limits the movement of transfer slide 52 which is provided with a slot 58 in which slot the positioning stud and bearing ride. A handle 60 is provided on the slide to provide a manual moving means. The frame 50 maintains the two plates and the transfer slide in a unit arrangement with the plates stationary with respect to each other.

The feed plate 42 is provided with a plurality of apertures 62 with guiding rims 64 surrounding the entrance ends thereof and these apertures 62 are large enough to accommodate the resin cementing pellets 66 with suitable clearance therebetween so as to prevent any sticking of the pellets in the apertures. The dispenser plate 48 is provided with a plurality of apertures 68 which are out of registry with feed plate apertures 62. These apertures 68 are also sufficiently large to easily accommodate the pellets 66. The transfer slide 52 is provided with a plurality of apertures 70 which are equal in number to apertures 62 and 68, and slide 52 is movable as shown in FIGURES 3 and 5 from a position in which the apertures 70 and 62 register to a position in which apertures 68 and 70 register. In this manner the pellets 66 may be transferred from the feed plate 42 to the dispensing plate 48 and hence to the lands of mold shell segment 72 as shown. The slot 58 in slide 52 is just long enough to allow the exact positioning of the slide apertures 70 with respect to apertures 62 and 68 to allow the exact registry thereof at each of the aforementioned slide positions.

In FIGURE 3 is shown the combination of the feed plate 42 and a stencil covering 43, which may be of cardboard or other suitable stencil material, lightly cemented to the top of plate 42 and easily removable so as to allow its replacement with other stencil configurations. This stencil 43 covers those apertures 45 in plate 42 which would normally drop pellets into the metal pour passages 80 of the mold segment. It is noted that apertures 45 could be eliminated entirely from plate 42 if plate 42 were not ever to be used for a variety of mold shapes. Moreover, any number of apertures could be provided in plates 42 and 48 and slide 52 and any stencil shape could be used to provide the necessary pellet drop pattern for any mold shape.

Referring to FIGURE 8 it is seen that a plurality of pellet dispensing tubes 74 are affixed to the outlet ends of apertures 68 in dispensing plate 48 and serve to deposit the pellets upon lands at varying levels on the mold segment 75. As shown in FIGURE 8 these lands may assume different heights as, for example, land 76, land 78, and land 79 and should the dispensing plate of FIGURE 3 be used and brought down as close to land 76 as possible before the pellets are dispensed thereon the pellets landing on land 78 would be very likely to bounce and roll off into the metal pouring passage portions 80 of the mold segment to therein vaporize upon contact with the molten metal and produce voids in the finished casting. It is readily seen, however, that the dispensing tubes 74 (particularly tube 82) are long enough to control the path of drop of the plastic pellet onto land 78. To allow the dispensing tubes to move out of the way of segment 75 the support means 12 may be adapted to move vertically before it swings horizontally. It is particularly noted that the pellets immediately upon landing on the lands extend slightly above the outlet end of the tubes of FIGURE 8 or the apertures 68 of FIGURE 3. This is so to prevent sidewise movement of the pellet immediately after it has struck the land and before it melts due to the heat of the mold segment, which is normally about 400° F. to 500° F., to assume the shape shown by partially melted pellet 84 resting on land 78. As soon as the pellets become slightly tacky due to their thermoplastic character as shown by pellets 84 and 85 in FIGURE 8, they will adhere to the lands and there is no chance for them to drop off and flow down into the metal pouring passages 80.

As shown in FIGURES 8 and 9 the dispensing tubes 74 may be provided with threaded ends 73 and shoulders 77 to provide a convenient means to attach these tubes to the dispensing plate 48. These threaded tube ends may screw into threaded apertures 69 in the plate 48 which apertures as shown in FIGURE 9 may be provided with replacement or adoptor inserts 71 which are screwed into the apertures in plate 48 when the tubes 74 are not in use.

As shown in FIGURE 7 the pellets which are now in a tacky and partially molten and deformed state have been deposited in a very accurate arrangement upon the different land portions of the mold segment 72. When the pellets have been so deposited, a cooperating mold segment is placed on top of segment 72 with the lands of each overlying the lands of the other and these segments are then compressed together while the thermosetting cementing pellets cure to join the segments together.

The particular chemical formulation of the pellet employed will depend upon the temperature of the mold segment as it comes from its curing oven wherein its ceramic powder has been found into a solid mass by the thermosetting plastic cement. The pellet must be initially thermoplastic at this mold temperature and capable of then being thermoset also at this temperature, or at temperatures close to it. It is noted that the size of the pellet will depend on the pellet depositing accuracy required for the particular job and the apertures in the plate and slide must be large enough to accommodate the largest dimension of the pellets whether they be round, square, rectangular, or any other shape.

We claim:

1. Apparatus for simultaneously placing a plurality of cementing pellets onto the lands of shell mold segments in a predetermined pattern comprising: a hopper containing pellets; a multi-apertured feed plate in the bottom of said hopper; a multi-apertured dispenser plate underlying said feed plate with the apertures therein out of registry with the aforesaid apertures in said feed plate; a multi-apertured transfer slide mounted between said plates and movable from a first position in which the apertures there in register with said apertures in said feed plate to a second position in which the apertures therein register with said apertures in said dispenser plate; and means included in said apparatus to predetermine the pattern in which said pellets are dispensed from said dispenser plate whereby said pellets are dispensed only onto the lands of the shell mold segment.

2. Apparatus for simultaneously placing a plurality of cementing pellets onto the lands of shell mold segments in a predetermined pattern comprising: a hopper containing pellets; a multi-apertured feed plate in the bottom of said hopper; a multi-apertured dispenser plate underlying said feed plate with the apertures therein out of registry with the aforesaid apertures in said feed plate; a multi-apertured transfer slide mounted between said plates and movable from a first position in which the apertures therein register with said apertures in said feed plate to a second position in which the apertures therein register with said apertures in said dispenser plate; means included in said apparatus to predetermine the pattern in which said pellets are dispensed from said dispenser plate whereby said pellets are dispensed only onto the lands of the shell mold segment; and dispenser tubes extending downwardly from said dispenser plate coaxially with the apertures therein, said dispenser tubes being of varying lengths corresponding to varying heights of lands in the shell mold segment to further control the dropping of the cement pellets onto the lands.

3. Apparatus for simultaneously placing a plurality of cementing pellets onto the lands of shell mold segments in a predetermined pattern comprising: a hopper containing pellets; a multi-apertured feed plate in the bottom of said hopper; a multi-apertured dispenser plate underlying said feed plate with the apertures therein out of registry with the aforesaid apertures in said feed plate; and a multi-apertured transfer slide mounted between said plates and movable from a first position in which the apertures therein register with said apertures in said feed plate to a second position in which the apertures therein register with said apertures in said dispenser plate; said apertures in at least one of said plates and slide being arranged in a predetermined pattern whereby said pellets are dispensed only onto the lands of the shell mold segment.

4. Apparatus for simultaneously placing a plurality of cementing pellets onto the lands of shell mold segments in a predetermined pattern comprising: a hopper containing pellets; a multi-apertured feed plate in the bottom of said hopper; a multi-apertured dispenser plate underlying said feed plate with the apertures therein out of registry with the apertures therein out of registry with the aforesaid apertures in said feed plate; and a multi-apertured transfer slide mounted between said plates and movable from a first position in which the apertures therein register with said apertures in said feed plate to a second position in which the apertures therein register with said apertures in said dispenser plate; said apertures in said feed plate being arranged in the predetermined pattern in which said pellets are to be dispensed from said dispenser plate onto the lands of the shell mold.

5. Apparatus for simultaneously placing a plurality of cementing pellets onto the lands of shell mold segments in a predetermined pattern comprising: a hopper containing cementing pellets; a multi-apertured feed plate in the bottom of said hopper; a multi-apertured dispenser plate underlying said feed plate with the apertures therein out of registry with the aforesaid apertures in said feed plate; a multi-apertured transfer slide mounted between said plates and movable from a first position in which the apertures therein register with the apertures in said feed plate to a second position in which the apertures therein register with the apertures in said dispenser plate; and blocking means for predetermined ones of the apertures in said feed plate, said blocking means being arranged to allow free passage through other ones of said apertures in said feed plate in the predetermined pattern desired.

6. Apparatus for simultaneously placing a plurality of cementing pellets onto the lands of shell mold segments in a predetermined pattern comprising: a hopper containing pellets; a multi-apertured feed plate in the bottom of said hopper; a multi-apertured dispenser plate underlying said feed plate with the apertures therein out of registry with the aforesaid apertures in said feed plate; a multi-apertured transfer slide mounted between said plates and movable from a first position in which the apertures therein register with said apertures in said feed plate to a second position in which the apertures therein register with said apertures in said dispenser plate; and blocking means overlying certain ones of the apertures in said feed plate, said blocking means conforming in configuration to the areas of the shell mold which are to be free of cementing pellets whereby the remaining ones of said apertures in said feed plate allow free passage of said pellets in the predetermined pattern desired.

7. Apparatus for joining shell mold segments into a complete mold comprising: support means for a first shell mold segment; a cementing pellet dispensing unit movably supported from said support means and selectively positionable above a shell mold segment supported therein and including a hopper containing cementing pellets, a multi-apertured feed plate in the bottom of said hopper, a multi-apertured dispenser plate underlying said feed plate with the apertures therein out of registry with the apertures in said feed plate, a multi-apertured transfer slide mounted between said plates and movable from a first position in which the apertures therein register with said apertures in said feed plate to a second position in which the apertures therein register with said apertures in said dispenser plate, and means included in said apparatus to predetermine the pattern in which said pellets are dispensed from said dispenser plate onto only the lands of said supported shell mold segment; and pressure exerting means supported from said support member above said first mold segment and adapted to press a second mating mold segment into engagement with said first mold segment after the depositing of cementing pellets by said dispensing unit.

References Cited in the file of this patent

UNITED STATES PATENTS

| | | |
|---|---|---|
| 780,680 | Peterson et al. | Jan. 24, 1905 |
| 795,676 | Ammen | July 25, 1905 |
| 1,861,003 | Foster | May 31, 1932 |
| 2,029,922 | Heckel et al. | Feb. 4, 1936 |
| 2,161,190 | Paull | June 6, 1939 |
| 2,610,937 | Frink et al. | Sept. 16, 1952 |
| 2,719,093 | Voris | Sept. 27, 1955 |
| 2,962,409 | Ludlow et al. | Nov. 29, 1960 |

FOREIGN PATENTS

| | | |
|---|---|---|
| 7,457 | Great Britain | Mar. 25, 1911 |
| 542,918 | Italy | May 11, 1956 |